US009471606B1

(12) United States Patent
Pedregal et al.

(10) Patent No.: US 9,471,606 B1
(45) Date of Patent: Oct. 18, 2016

(54) OBTAINING INFORMATION TO PROVIDE TO USERS

(71) Applicant: Google Inc., Mountain View, CA (US)

(72) Inventors: Christopher Pedregal, New York, NY (US); Mathew Cowan, New York, NY (US)

(73) Assignee: Google Inc., Mountain View, CA (US)

( * ) Notice: Subject to any disclaimer, the term of this patent is extended or adjusted under 35 U.S.C. 154(b) by 350 days.

(21) Appl. No.: 13/842,544

(22) Filed: Mar. 15, 2013

Related U.S. Application Data

(60) Provisional application No. 61/664,079, filed on Jun. 25, 2012.

(51) Int. Cl.
*G06F 17/30* (2006.01)

(52) U.S. Cl.
CPC ... *G06F 17/30286* (2013.01); *G06F 17/30386* (2013.01); *G06F 17/30554* (2013.01); *G06F 17/30867* (2013.01)

(58) Field of Classification Search
USPC ........................................................ 707/748
See application file for complete search history.

(56) References Cited

U.S. PATENT DOCUMENTS

| | | | |
|---|---|---|---|
| 5,666,502 A | 9/1997 | Capps | |
| 5,946,647 A | 8/1999 | Miller et al. | |
| 6,311,178 B1 * | 10/2001 | Bi | G06F 17/3053 705/37 |
| 6,513,036 B2 | 1/2003 | Fruensgaard et al. | |
| 6,832,218 B1 | 12/2004 | Emens et al. | |
| 6,847,959 B1 | 1/2005 | Arrouye et al. | |
| 6,944,612 B2 | 9/2005 | Roustant et al. | |
| 7,502,770 B2 | 3/2009 | Hillis et al. | |
| 7,562,076 B2 | 7/2009 | Kapur | |
| 7,565,139 B2 | 7/2009 | Neven, Sr. et al. | |
| 7,593,845 B2 * | 9/2009 | Ramsey | G06F 17/2715 704/200 |
| 7,603,374 B2 | 10/2009 | Cameron et al. | |
| 7,614,008 B2 | 11/2009 | Ording | |

(Continued)

FOREIGN PATENT DOCUMENTS

| | | |
|---|---|---|
| CN | 101341464 A | 1/2009 |
| WO | WO 0131479 | 5/2001 |

(Continued)

OTHER PUBLICATIONS

Marie-Catherine De Marneffe, Christopher D. Manning, "Stanford Typed Dependencies Manual," Sep. 2011, 24 pages.

(Continued)

*Primary Examiner* — Jean M Corrielus
(74) *Attorney, Agent, or Firm* — Fish & Richardson P.C.

(57) ABSTRACT

Methods, systems, and apparatus, including computer programs encoded on computer storage media, for obtaining information to provide to users. One of the methods includes receiving a plurality of entities for a first user, wherein each of the plurality of entities is associated with a first score, wherein the first score associated with a particular entity represents a level of confidence that the first user is interested in the particular entity; and for one or more first entities of the plurality of entities: determining a second score based on the first score for the entity, wherein the second score indicates a level of confidence that the first user should receive notifications associated with the entity; determining that the second score satisfies a threshold; obtaining information associated with the entity; and providing the information to be presented in the form of a notification to the first user.

36 Claims, 8 Drawing Sheets

(56) References Cited

U.S. PATENT DOCUMENTS

| | | | |
|---|---|---|---|
| 7,720,702 | B2 | 5/2010 | Fredericks et al. |
| 7,761,414 | B2 | 7/2010 | Freedman |
| 7,765,206 | B2 | 7/2010 | Hillis et al. |
| 7,797,336 | B2 | 9/2010 | Blair et al. |
| 7,818,324 | B1 | 10/2010 | Held et al. |
| 7,895,196 | B2 | 2/2011 | Mahadevan et al. |
| 7,933,900 | B2 | 4/2011 | Reddy et al. |
| 7,956,847 | B2 | 6/2011 | Christie |
| 7,974,892 | B2 | 7/2011 | Fredericks et al. |
| 8,005,720 | B2 | 8/2011 | King et al. |
| 8,051,104 | B2 | 11/2011 | Weissman et al. |
| 8,069,175 | B2 | 11/2011 | Hillis et al. |
| 8,086,604 | B2 | 12/2011 | Arrouye et al. |
| 8,117,136 | B2 * | 2/2012 | Yang ............... H04M 1/72522 706/10 |
| 8,140,361 | B2 | 3/2012 | Fredericks et al. |
| 8,150,813 | B2 * | 4/2012 | Adair ............... G06F 17/30536 707/692 |
| 8,185,487 | B2 * | 5/2012 | Tuzhilin et al. ............... 706/47 |
| 8,204,856 | B2 | 6/2012 | Meyer et al. |
| 8,229,883 | B2 * | 7/2012 | Brauer ............... G06F 17/30622 707/602 |
| 8,286,885 | B1 | 10/2012 | Zehr et al. |
| 8,316,029 | B2 | 11/2012 | Lawrence |
| 8,370,328 | B2 * | 2/2013 | Woytowitz ........ G06F 17/30731 707/719 |
| 8,392,431 | B1 * | 3/2013 | Agassy ............ G06F 17/30867 707/748 |
| 8,412,712 | B2 * | 4/2013 | Caceres ........... G06F 17/30539 706/20 |
| 8,429,103 | B1 | 4/2013 | Aradhye et al. |
| 8,473,489 | B1 * | 6/2013 | Lasko ............... G06F 17/3097 707/726 |
| 8,510,247 | B1 * | 8/2013 | Kane et al. ............... 706/46 |
| 8,615,516 | B2 * | 12/2013 | Caceres ........... G06F 17/30539 707/736 |
| 8,666,927 | B2 * | 3/2014 | Lappas ............... G06Q 10/00 706/52 |
| 8,775,439 | B1 * | 7/2014 | Lasko ............. G06F 17/30864 707/706 |
| 8,843,466 | B1 * | 9/2014 | Zeiger ............. G06F 17/30864 707/706 |
| 8,856,099 | B1 * | 10/2014 | Lasko ............... G06F 7/00 707/706 |
| 8,965,848 | B2 * | 2/2015 | Caceres ............ G06F 17/30303 707/626 |
| 2002/0083039 | A1 | 6/2002 | Ferrari et al. |
| 2004/0093321 | A1 | 5/2004 | Roustant et al. |
| 2006/0026147 | A1 | 2/2006 | Cone et al. |
| 2006/0097991 | A1 | 5/2006 | Hotelling et al. |
| 2006/0212930 | A1 * | 9/2006 | Shull ............... G06F 21/55 726/10 |
| 2007/0260594 | A1 | 11/2007 | Lewak et al. |
| 2008/0010273 | A1 | 1/2008 | Frank |
| 2008/0126143 | A1 | 5/2008 | Altman et al. |
| 2008/0235216 | A1 * | 9/2008 | Ruttenberg ............ G06Q 30/02 |
| 2009/0058821 | A1 | 3/2009 | Chaudhri et al. |
| 2009/0083262 | A1 * | 3/2009 | Chang ............... G06F 17/30867 |
| 2009/0167704 | A1 | 7/2009 | Terlizzi et al. |
| 2009/0224867 | A1 | 9/2009 | O'Shaughnessy et al. |
| 2010/0070448 | A1 | 3/2010 | Omoigui |
| 2011/0137883 | A1 | 6/2011 | Lagad et al. |
| 2011/0184981 | A1 | 7/2011 | Lu et al. |
| 2011/0197152 | A1 * | 8/2011 | Assadollahi .......... G06F 3/0482 715/764 |
| 2011/0202493 | A1 | 8/2011 | Li |
| 2011/0258006 | A1 | 10/2011 | Koetting et al. |
| 2012/0059745 | A1 | 3/2012 | Fredericks et al. |
| 2012/0066627 | A1 | 3/2012 | Furukawa et al. |
| 2012/0084248 | A1 * | 4/2012 | Gavrilescu ...................... 706/52 |
| 2012/0095996 | A1 * | 4/2012 | Dumant ............ G06F 17/30528 707/728 |
| 2012/0101858 | A1 | 4/2012 | Depasquale et al. |
| 2012/0101901 | A1 | 4/2012 | Depasquale et al. |
| 2012/0150572 | A1 | 6/2012 | Fredericks et al. |
| 2012/0159340 | A1 | 6/2012 | Bae et al. |
| 2012/0246153 | A1 | 9/2012 | Pehle |
| 2012/0330906 | A1 | 12/2012 | Fredericks et al. |
| 2013/0054542 | A1 | 2/2013 | Ollenberger et al. |
| 2013/0110833 | A1 | 5/2013 | Fredericks et al. |

FOREIGN PATENT DOCUMENTS

| | | |
|---|---|---|
| WO | WO 2006110480 | 10/2006 |
| WO | WO 2010120925 | 10/2010 |

OTHER PUBLICATIONS

Kao, Wayne, "Telling the Story of Friendships," Facebook, Oct. 28, 2010, available at http://blog.facebook.com/blog.php-?post=443390892130, pp. 1-2.

Dekang Lin, "Dependency-based Evaluation of MINIPAR," In Workshop on the Evaluation of Parsing Systems, May 1, 1998, 14 pages, Granada, Spain.

Rion Snow, Daniel Jurafsky, Andrew Y. Ng, "Learning Syntactic Patterns for Automatic Hypernym Discovery," 2011, 8 pages.

Veselin Stoyanov, Claire Cardie, Nathan Gilbert, Ellen Riloff, David Buttler, David Hysom, "Reconcile: A Coreference Resolution Research Platform," May 13, 2010, 14 pages.

Tripit, "Announcing TripIt—The First Intelligent Travel Organizer for Do-It-Yourself Trip Planners," Concur Technologies Inc., Sep. 18, 2007, available at http://www.tripit.com/press/company-announcements/announcing-tripit-first-intelligent-travel-organizer-do-it-yourself-trip, pp. 1-2.

Brent W. Hopkins, "Dolphin Browser HD," Washington Post, Aug. 8, 2010, 2 pages.

Ty McMahan, "Sequioa Leads $10M Series A for Mobile Browser Co. Mobotap," Press Release—Dow Jones Venture Wire, Jul. 18, 2011, Dow Jones Financial Information Services, 1 page.

TripIt, "TripIt Brings Travel Itineraries to Mobile Phones," Concur Technologies Inc., Apr. 7, 2008, available at http://www.tripit.com/press/company-announcements/tripit-brings-travel-itineraries-mobile-phones, pp. 1-2.

* cited by examiner

OBTAINING INFORMATION TO PROVIDE TO USERS

This application claims priority to U.S. Provisional Application No. 61/664,079, filed Jun. 25, 2012, which is incorporated by reference herein in its entirety.

BACKGROUND

This specification relates generally to providing notification information.

User devices, e.g., cell phones, tablets, personal assistant devices, computers, etc., provide users with information. Users can request specific information that is of interest to the user. For example, user devices can provide users with contact information, upcoming calendar events, traffic information, weather information, as well as any Internet accessible information requested by the user. User devices also provide notifications to users. For example, when a cell phone receives a call, the cell phone may provide a visual notification, e.g., a screen may display call information, an audible notification, e.g., a speaker may generate a ring tone, and/or a sensory notification, e.g., a motor causing vibrations. The user experience of a user device can depend on its ability to provide information notifications that are of interest to the user.

SUMMARY

This specification describes technology relating to obtaining information to provide to users.

In general, one innovative aspect of the subject matter described in this specification can be embodied in methods that include the actions of receiving a plurality of entities for a first user, wherein each of the plurality of entities is associated with a first score, wherein the first score associated with a particular entity represents a level of confidence that the first user is interested in the particular entity; and for one or more first entities of the plurality of entities: determining a second score based on the first score for the entity, wherein the second score indicates a level of confidence that the first user should receive notifications associated with the entity; determining that the second score satisfies a threshold; obtaining information associated with the entity; and providing the information to be presented in the form of a notification to the first user.

The foregoing and other embodiments can each optionally include one or more of the following features, alone or in combination. In particular, one embodiment may include all the following features in combination.

For one or more second entities of the plurality of entities, the methods can further include the actions of calculating a second score based on the first score for the entity; determining that the second score does not satisfy the threshold; and determining that the user should not receive notifications associated with the entity.

Determining a second score based on the first score for the entity can further include obtaining one or more signals that indicate whether the user should receive notifications for the entity, wherein the one or more signals describe at least one of a popularity of the entity, a proximity of the first user to a geo-location associated with the entity, and feedback about notifications associated with the entity, wherein the feedback is provided by one or more other users that have received notifications associated with the entity; and providing the first score and the one or more additional signals to a trained machine learning system.

Obtaining information associated with the entity can further include identifying the first user's interaction state with the entity based on data associated with the first user; and determining the information to obtain based on the first user's interaction state with the entity.

Identifying the first user's interaction state with the entity can include determining how the first user has engaged with the entity from the first user's online profile; and identifying the first user's interaction state with the entity based on how the first user has engaged with the entity.

Determining the information to obtain based on the first user's interaction state with the entity can include identifying information that logically follows the first user's interaction state with the entity.

Obtaining information associated with the entity can further include obtaining information that is associated with the entity in a data source. Obtaining information that is associated with the entity in a data source can further include obtaining information based on a freshness of the information. The data source can be one or more knowledge graphs or one or more publicly available databases.

Providing the information to be presented can include assigning a viewing window to the information, wherein the viewing window determines when the information should be presented to the user relative to a time point; and presenting the information to the first user based on the viewing window. The methods can further include the actions of modifying the viewing window based on one or more signals that indicate at least one of a popularity of the entity, the first user's level of interest in the entity, or a finality of an event described by the information.

The notification can include at least one of a title describing the information, a description of the information, or links that allow the first user to take additional actions on the information.

The subject matter described in this specification can be implemented in particular embodiments so as to realize one or more of the following advantages. Information that is of interest to users can be determined. This information can be provided to users automatically. Time windows for when to deliver this information to users can be optimized.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

In some implementations, data may be organized in a database using any one or more data structuring techniques. For example, data may be organized in a graph containing nodes connected by edges. In some implementations, the data may include statements about relationships between things and concepts, and those statements may be represented as nodes and edges of a graph. The nodes each contain a piece or pieces of data and the edges represent relationships between the data contained in the nodes that the edges connect. In some implementations, the graph includes one or more pairs of nodes connected by an edge. The edge, and thus the graph, may be directed, i.e. unidirectional, undirected, i.e. bidirectional, or both, i.e. one or more edges may be undirected and one or more edges may be directional in the same graph. Nodes may include any suitable data or data representation. Edges may describe any suitable relationships between the data. In some implementations, an edge is labeled or annotated, such that it includes both the connection between the nodes, and descriptive information about that connection. A particular node may be connected by distinct edges to one or more other nodes, or to itself, such that an extended graph is formed. For purposes of clarity, a graph based on the structure described immediately above is referred to herein as a knowledge graph. In some implementations, the knowledge graph may be a useful for representing information and in providing information in search.

Figure 1:
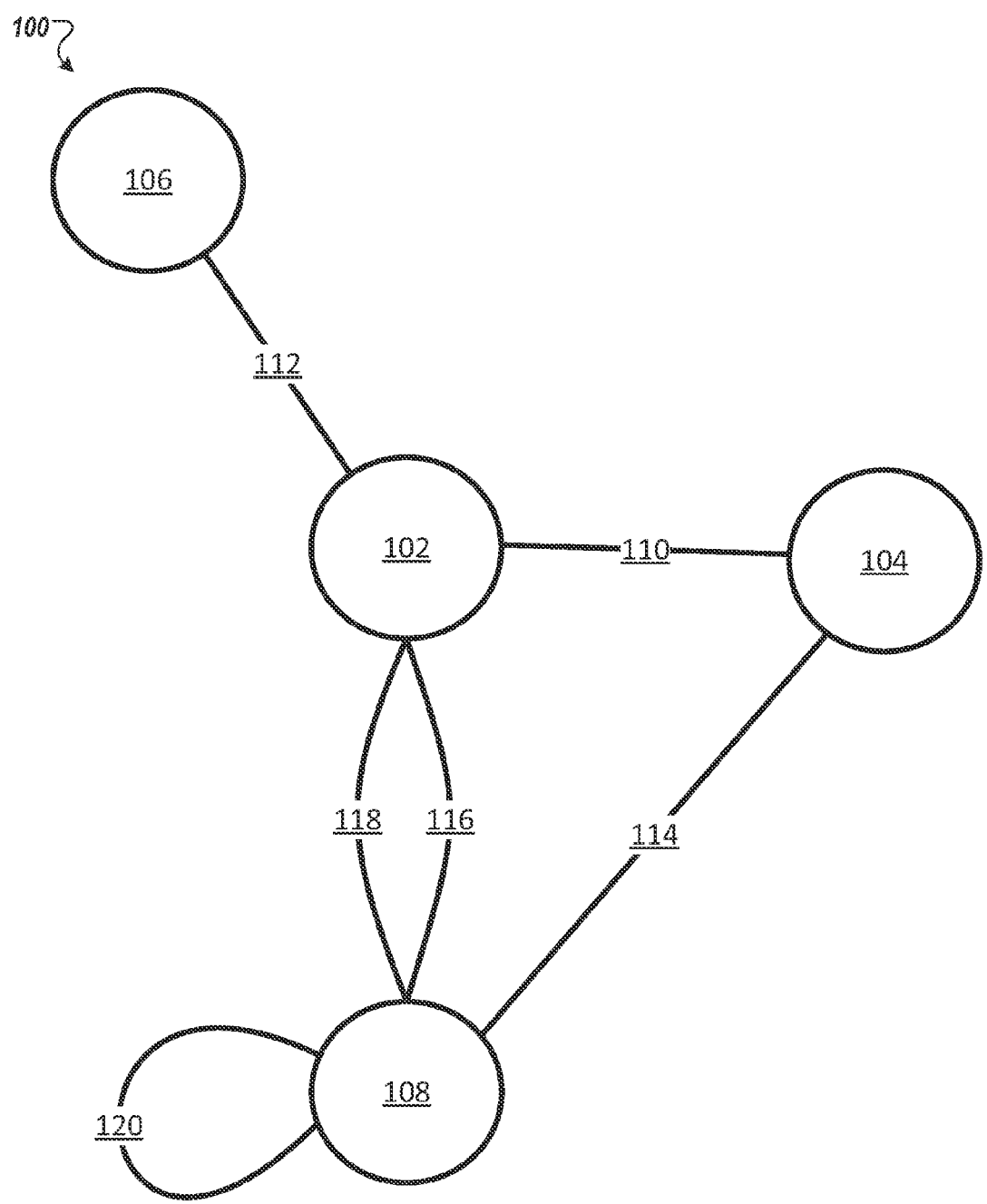
FIG. 1 illustrates an example knowledge graph containing nodes and edges.

FIG. 1 illustrates an example knowledge graph 100 containing nodes and edges. Illustrative knowledge graph 100 includes nodes 102, 104, 106, and 108. Knowledge graph 100 includes edge 110 connecting node 102 and node 104. Knowledge graph 100 includes edge 112 connecting node 102 and node 106. Knowledge graph 100 includes edge 114 connecting node 104 and node 108. Knowledge graph 100 includes edge 116 and edge 118 connecting node 102 and node 108. Knowledge graph 100 includes edge 120 connecting node 108 to itself. Each aforementioned group of an edge and one or two distinct nodes may be referred to as a triple or 3-tuple. As illustrated, node 102 is directly connected by edges to three other nodes, while nodes 104 and 108 are directly connected by edges to two other nodes. Node 106 is connected by an edge to only one other node, and in some implementations, node 106 is referred to as a terminal node. As illustrated, nodes 102 and 108 are connected by two edges, indicating that the relationship between the nodes is defined by more than one property. As illustrated, node 108 is connected by edge 120 to itself, indicating that a node may relate to itself. While illustrative knowledge graph 100 contains edges that are not labeled as directional, it will be understood that each edge may be unidirectional or bidirectional. It will be understood that this example of a graph is merely an example and that any suitable size or arrangement of nodes and edges may be employed.

Generally, nodes in a knowledge graph can be grouped into several categories. Nodes may represent entities, organizational data such as entity types and properties, literal values, and models of relationships between other nodes.

In some implementations, entity types, properties, and other suitable content is created, defined, redefined, altered, or otherwise generated by any suitable technique. For example, content may be generated by manual user input, by automatic responses to user interactions, by importation of data from external sources, by any other suitable technique, or any combination thereof. For example, if a commonly searched for term is not represented in the knowledge graph, one or more nodes representing that node may be added. In another example, a user may manually add information and organizational structures.

A node of a knowledge graph may represent an entity. An entity is a thing or concept that is singular, unique, well-defined and distinguishable. For example, an entity may be a person, place, item, idea, abstract concept, concrete element, other suitable thing, or any combination thereof. Nodes are unique, in that no two nodes refer to the same thing or concept. Generally, entities include things or concepts represented linguistically by nouns. For example, the color "Blue," the city "San Francisco," and the imaginary animal "Unicorn" may each be entities. An entity generally refers to the concept of the entity. For example, the entity "New York City" refers to the physical city, and the knowledge graph uses a concept of the physical city as represented by, for example, an element in a data structure, the name of the entity, any other suitable element, or any combination thereof.

A node representing organizational data may be included in a knowledge graph. These may be referred to herein as entity type nodes. As used herein, an entity type node may refer to a node in a knowledge graph, while an entity type may refer to the concept represented by an entity type node. An entity type may be a defining characteristic of an entity. For example, entity type node Y may be connected to an entity node X by an "Is A" edge or link, discussed further below, such that the graph represents the information "The Entity X Is Type Y." For example, the entity node "George Washington" may be connected to the entity type node "President." An entity node may be connected to multiple entity type nodes, for example, "George Washington" may also be connected to entity type node "Person" and to entity type node "Military Commander." In another example, the entity type node "City" may be connected to entity nodes "New York City" and "San Francisco." In another example, the concept "Tall People," although incompletely defined, i.e., it does not necessarily include a definition of "tall", may exist as an entity type node. In some implementations, the presence of the entity type node "Tall People," and other entity type nodes, may be based on user interaction.

In some implementations, an entity type node may include or be connected to data about: a list of properties associated with that entity type node, the domain to which that entity type node belongs, descriptions, values, any other suitable information, or any combination thereof. A domain refers to a collection of related entity types. For example, the domain "Film" may include, for example, the entity types "Actor," "Director," "Filming Location," "Movie," any other suitable entity type, or any combination thereof. In some implementations, entities are associated with types in more than one domain. For example, the entity node "Benjamin Franklin" may be connected with the entity type node "Politician" in the domain "Government" as well as the entity type node "Inventor" in the domain "Business".

In some implementations, properties associated with entity nodes or entity type nodes may also be represented as nodes. For example, nodes representing the property "Population" or "Location" may be connected to the entity type node "City." The combination and/or arrangement of an entity type and its properties is referred to as a schema. In some implementations, schemas are stored in tables or other suitable data structures associated with an entity type node.

In some implementations, the knowledge graph may be self-defining or bootstrapping, such that it includes particular nodes and edges that define the concept of nodes, edges, and the graph itself. For example, the knowledge graph may contain an entity node "Knowledge Graph" that is connected to property nodes that describe a knowledge graph's properties such as "Has Nodes" and "Has Edges."

Specific values, in some implementations referred to as literals, may be associated with a particular entity in a terminal node by an edge defining the relationship. Literals may refer to values and/or strings of information. For example, literals may include dates, names, and/or numbers. In an example, the entity node "San Francisco" may be connected to a terminal node containing the literal "815,000" by an edge annotated with the property "Has Population." In some implementations, terminal nodes may contain a reference or link to long text strings and other information stored in one or more documents external to the knowledge graph. In some implementations, literals are stored as nodes in the knowledge graph. In some implementations, literals are stored in the knowledge graph but are not assigned a unique identification reference as described below, and are not capable of being associated with multiple entities. In some implementations, literal type nodes may define a type of literal, for example "Date/Time," "Number," or "GPS Coordinates."

In some implementations, the grouping of an edge and two nodes is referred to as a triple. The triple represents the relationship between the nodes, or in some implementations, between the node and itself. In some implementations, higher order relationships are modeled, such as quaternary and n-ary relationships, where n is an integer greater than 2. In some implementations, information modeling the relationship is stored in a node, which may be referred to as a mediator node. In an example, the information "Person X Donates Artifact Y To Museum Z" is stored in a mediator node connected entity nodes to X, Y, and Z, where each edge identifies the role of each respective connected entity node.

In some implementations, the knowledge graph may include information for differentiation and disambiguation of terms and/or entities. As used herein, differentiation refers to the many-to-one situation where multiple names are associated with a single entity. As used herein, disambiguation refers to the one-to-many situation where the same name is associated with multiple entities. In some implementations, nodes may be assigned a unique identification reference. In some implementations, the unique identification reference may be an alphanumeric string, a name, a number, a binary code, any other suitable identifier, or any combination thereof. The unique identification reference may allow the system to assign unique references to nodes with the same or similar textual identifiers. In some implementations, the unique identifiers and other techniques are used in differentiation, disambiguation, or both.

In some implementations of differentiation, a node may be associated with multiple terms or differentiation aliases in which the terms are associated with the same entity. For example, the terms "George Washington," "Geo. Washington, "President Washington," and "President George Washington" may all be associated with a single entity, i.e., node, in the knowledge graph. This may provide differentiation and simplification in the knowledge graph.

In some implementations of disambiguation, multiple nodes with the same or similar names are defined by their unique identification references, by associated nodes in the knowledge graph, by any other suitable information, or any combination thereof. For example, there may be an entity node related to the city "Philadelphia," an entity node related to the movie "Philadelphia," and an entity node related to the cream cheese brand "Philadelphia." Each of these nodes may have a unique identification reference, stored for example as a number, for disambiguation within the knowledge graph. In some implementations, disambiguation in the knowledge graph is provided by the connections and relationships between multiple nodes. For example, the city "New York" may be disambiguated from the state "New York" because the city is connected to an entity type "City" and the state is connected to an entity type "State." It will be understood that more complex relationships may also define and disambiguate nodes. For example, a node may be defined by associated types, by other entities connected to it by particular properties, by its name, by any other suitable information, or any combination thereof. These connections may be useful in disambiguating, for example, the node "Georgia" that is connected to the node "United States" may be understood represent the U.S. State, while the node "Georgia" connected to the nodes "Asia" and "Eastern Europe" may be understood to represent the country in eastern Europe.

In some implementations, a node may include or connect to data defining one or more attributes. The attributes may define a particular characteristic of the node. The particular attributes of a node may depend on what the node represents. In some implementations, an entity node may include or connect to: a unique identification reference, a list of entity types associated with the node, a list of differentiation aliases for the node, data associated with the entity, a textual description of the entity, links to a textual description of the entity, other suitable information, or any combination thereof. As described above, nodes may contain a reference or link to long text strings and other information stored in one or more documents external to the knowledge graph. In some implementations, the storage technique may depend on the particular information. For example, a unique identification reference may be stored within the node, a short information string may be stored in a terminal node as a literal, and a long description of an entity may be stored in an external document linked to by a reference in the knowledge graph.

An edge in a knowledge graph may represent a semantic connection defining a relationship between two nodes. The edge may represent a prepositional statement such as "Is A," "Has A," "Is Of A Type." "Has Property." "Has Value," any other suitable statement, or any combination thereof. For example, the entity node of a particular person may be connected by a "Date Of Birth" edge to a terminal node containing a literal of his or her specific date of birth. In some implementations, the properties defined by edge connections of an entity may relate to nodes connected to the type of that entity. For example, the entity type node "Movie" may be connected to entity nodes "Actor" and "Director," and a particular movie may be connected by an edge property "Has Actor" to an entity node representing a particular actor.

In some implementations, nodes and edges define the relationship between an entity type node and its properties, thus defining a schema. For example, an edge may connect an entity type node to a node associated with a property, which may be referred to as a property node. Entities of the type may be connected to nodes defining particular values of those properties. For example, the entity type node "Person" may be connected to property node "Date of Birth" and a node "Height." Further, the node "Date of Birth" may be connected to the literal type node "Date/Time," indicating that literals associated with "Date of Birth" include date/time information. The entity node "George Washington," which is connected to entity type node "Person" by an "Is A" edge, may also be connected to a literal "Feb. 22, 1732" by the edge "Has Date Of Birth." In some implementations, the entity node "George Washington" is connected to a "Date Of Birth" property node. It will be understood that in some implementations, both schema and data are modeled and stored in a knowledge graph using the same technique. In this way, both schema and data can be accessed by the same search techniques. In some implementations, schemas are stored in a separate table, graph, list, other data structure, or any combination thereof. It will also be understood that properties may be modeled by nodes, edges, literals, any other suitable data, or any combination thereof.

For example, the entity node "George Washington" may be connected by an "Is A" edge to the entity type node representing "Person," thus indicating an entity type of the entity, and may also be connected to a literal "Feb. 22, 1732" by the edge "Has Date Of Birth," thus defining a property of the entity. In this way, the knowledge graph defines both entity types and properties associated with a particular entity by connecting to other nodes. In some implementations, "Feb. 22, 1732" may be a node, such that it is connected to other events occurring on that date. In some implementations, the date may be further connected to a year node, a month node, and a day of node. It will be understood that this information may be stored in any suitable combination of literals, nodes, terminal nodes, interconnected entities, any other suitable arrangement, or any combination thereof.

Figure 2:
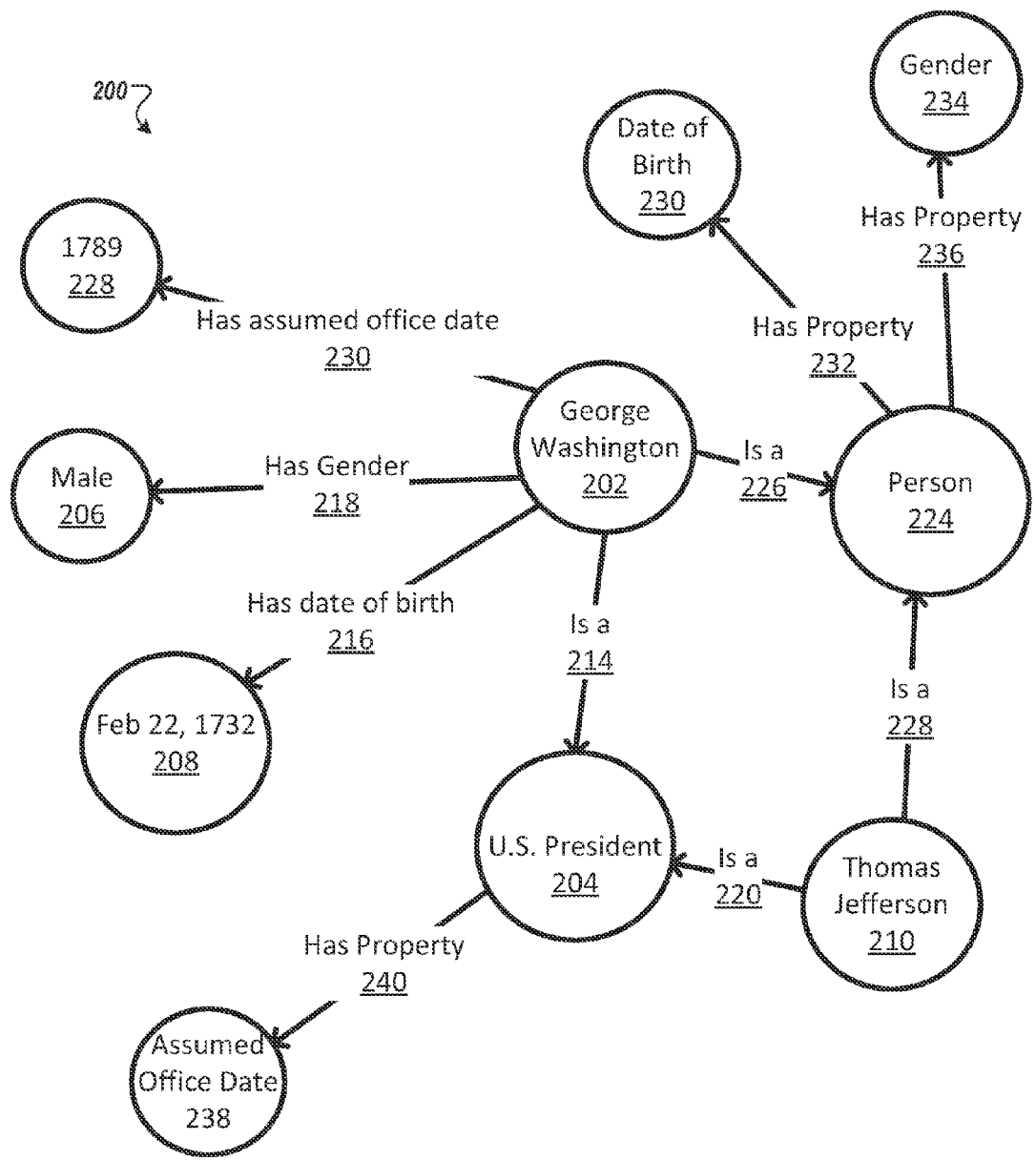
FIG. 2 illustrates an example knowledge graph portion.

FIG. 2 illustrates an example knowledge graph portion 200. Knowledge graph portion 200 includes information related to the entity "George Washington," represented by "George Washington" node 202. "George Washington" node 202 is connected to "U.S. President" entity type node 204 by "Is A" edge 214 with the semantic content "Is A," such that the 3-tuple defined by nodes 202 and 204 and the edge 214 contains the information "George Washington is a U.S. President." Similarly, the information "Thomas Jefferson Is A U.S. President" is represented by the tuple of "Thomas Jefferson" node 210, "Is A" edge 220, and "U.S. President" node 204. Knowledge graph portion 200 includes entity type nodes "Person" 224, and "U.S. President" node 204. The person type is defined in part by the connections from "Person" node 224. For example, the type "Person" is defined as having the property "Date Of Birth" by node 230 and edge 232, and is defined as having the property "Gender" by node 234 and edge 236. These relationships define in part a schema associated with the entity type "Person."

"George Washington" node 202 is shown in knowledge graph portion 200 to be of the entity types "Person" and "U.S. President," and thus is connected to nodes containing values associated with those types. For example, "George Washington" node 202 is connected by "Has Gender" edge 218 to "Male" node 206, thus indicating that "George Washington has gender "Male." Further, "Male" node 206 may be connected to the "Gender" node 234 indicating that "Male Is A Type Of Gender." Similarly, "George Washington" node 202 is connected by "Has Date of Birth" edge 216 to "Feb. 22, 1732" node 208, thus indicating that "George Washington Has Date Of Birth Feb. 22, 1732." "George Washington" node 202 may also be connected to "1789" node 228 by "Has Assumed Office Date" edge 230.

Knowledge graph portion 200 also includes "Thomas Jefferson" node 210, connected by "Is A" edge 220 to entity type "U.S. President" node 204 and by "Is A" edge 228 to "Person" entity type node 224. Thus, knowledge graph portion 200 indicates that "Thomas Jefferson" has the entity types "U.S. President" and "Person." In some implementations, "Thomas Jefferson" node 210 is connected to nodes not shown in FIG. 2 referencing his date of birth, gender, and assumed office date.

It will be understood that knowledge graph portion 200 is merely an example and that it may include nodes and edges not shown. For example, "U.S. President" node 204 may be connected to all of the U.S. Presidents. "U.S. President" node 204 may also be connected to properties related to the entity type such as a duration of term, for example "4 Years," a term limit, for example "2 Terms," a location of office, for example "Washington D.C.," any other suitable data, or any combination thereof. For example, "U.S. President" node 204 is connected to "Assumed Office Date" node 238 by "Has Property" edge 240, defining in part a schema for the type "U.S. President." Similarly, "Thomas Jefferson" node 210 may be connected to any suitable number of nodes containing further information related to his illustrated entity type nodes "U.S. President," and "Person," and to other entity type nodes not shown such as "Inventor," "Vice President," and "Author." In a further example, "Person" node 224 may be connected to all entities in the knowledge graph with the type "Person." In a further example, "1789" node 228 may be connected to all events in the knowledge graph with the property of year "1789." "1789" node 228 is unique to the year 1789, and disambiguated from, for example, a book entitled "1789," not shown in FIG. 2, by its unique identification reference. In some implementations. "1789" node 228 is connected to the entity type node "Year."

Figure 3:
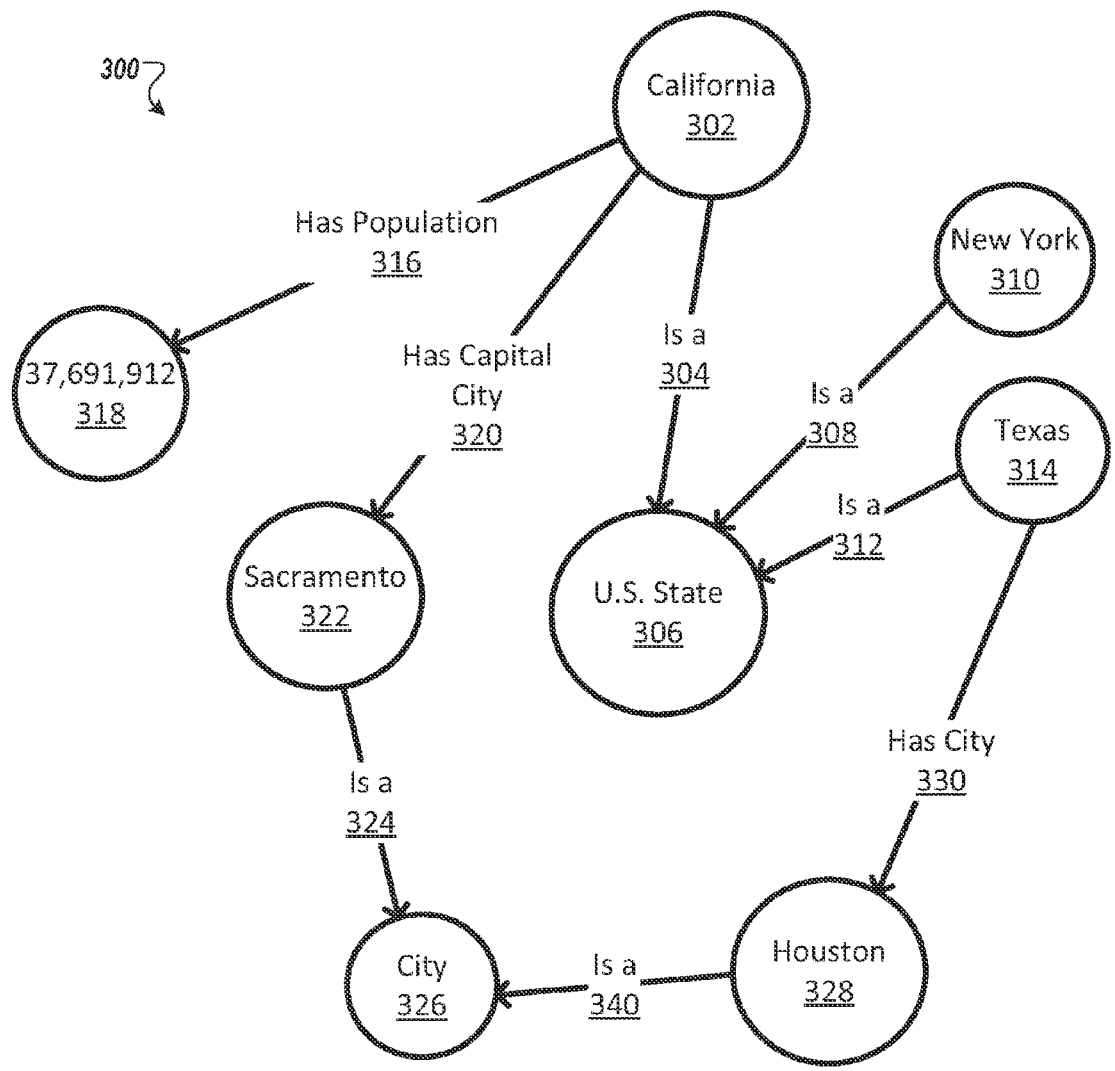
FIG. 3 illustrates another example knowledge graph portion.

FIG. 3 illustrates another example knowledge graph portion 300. Knowledge graph portion 300 includes "California" node 302, which may also be associated with differentiation aliases such as, for example, "CA," "Calif.," "Golden State," any other suitable differentiation aliases, or any combination thereof. In some implementations, these differentiations are stored in "California" node 302. California is connected by "Is A" edge 304 to the "U.S. State" entity type node 306. "New York" node 310 and "Texas" node 314 are also connected to "U.S. State" node 306 by "Is A" edges 308 and 312, respectively. "California" node 302 is connected by "Has Capital City" edge 320 to "Sacramento" node 322, indicating the information that "California Has Capital City Sacramento." Sacramento node 322 is further connected by "Is A" edge 324 to the "City" entity type node 326. Similarly, "Texas" node 314 is connected by "Has City" edge 330 to "Houston" node 328, which is further connected to the "City" entity type node 326 by "Is A" edge 340. "California" node 302 is connected by "Has Population" edge 316 to node 318 containing the literal value "37,691,912." In an example, the particular value "37,691,912" may be periodically automatically updated by the knowledge graph based on an external website or other source of data. Knowledge graph portion 300 may include other nodes not shown. For example, "U.S. State" entity type node 306 may be connected to nodes defining properties of that type such as "Population" and "Capital City." These type-property relationships may be used to define other relationships in knowledge graph portion 300 such as "Has population" edge 316 connecting entity node "California" 316 with terminal node 318 containing the literal defining the population of California.

Figure 4:
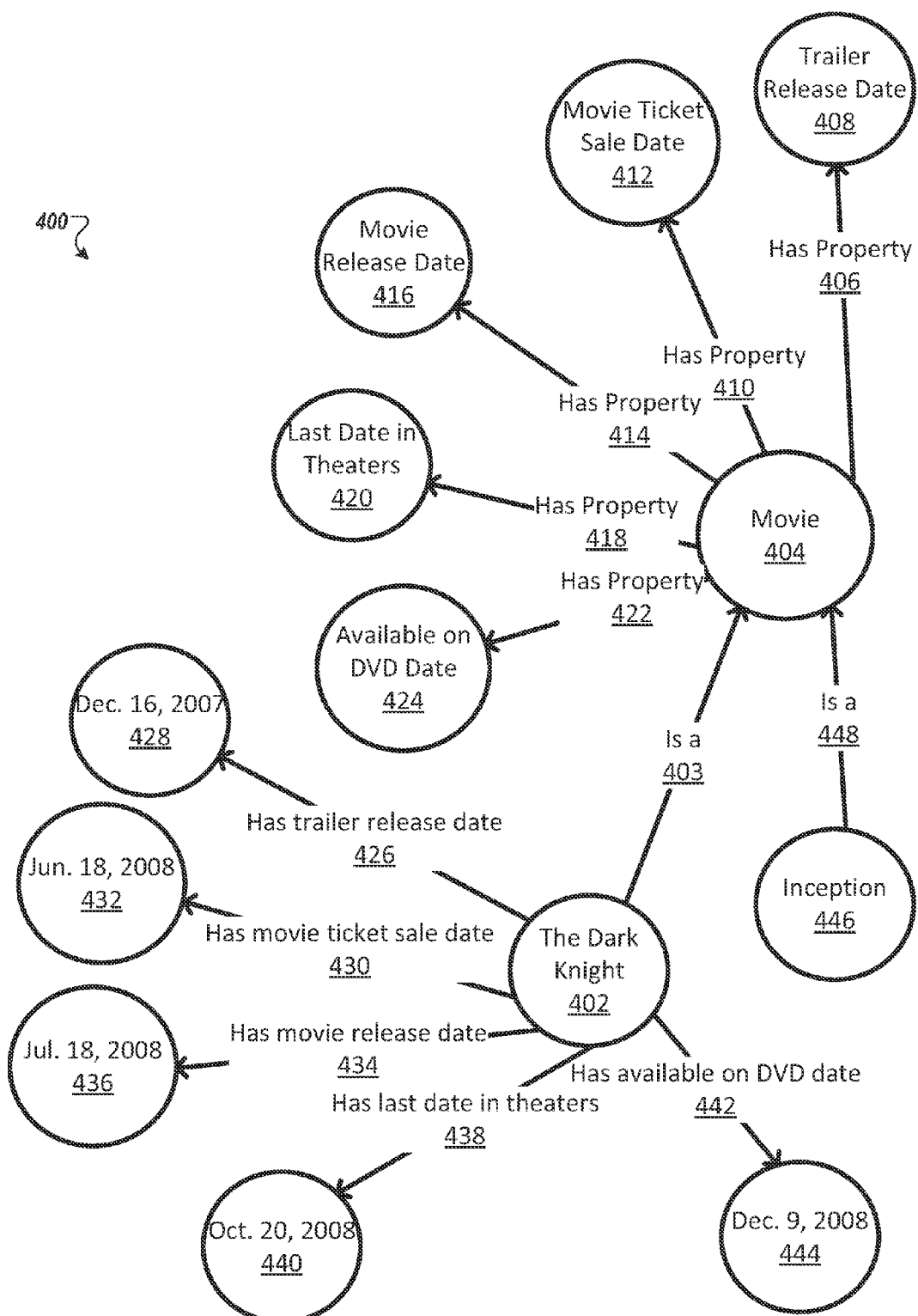
FIG. 4 illustrates another example knowledge graph portion.

FIG. 4 illustrates another example knowledge graph portion 400. Knowledge graph portion 400 includes information related to the movie entity "The Dark Knight," represented by "The Dark Knight" node 402. "The Dark Knight" is connect by "Is a" edge 403 to the "Movie" entity type node 404. "Inception" node 446 is also connected to "Movie" node 404 by "Is a" edge 448.

The entity type "Movie" is defined in part by the connections from "Movie" node 404. For example, the type "Movie" is defined as having the properties "Trailer Release Date" by node 408 and edge 406, "Movie Ticket Sale Date" by node 412 and edge 410, "Movie Release Date" by node 416 and edge 414, "Last Date in Theaters" by node 420 and edge 418, and "Available on DVD date" by node 424 and edge 422. These relationships define in part a schema associated with the entity type "Movie."

"The Dark Knight" node 202 is shown in knowledge graph portion 400 to be of the entity type "Movie," and thus is connected to nodes containing values associated with the entity type. For example, "The Dark Knight" node 402 is connected by "Has trailer release date" edge 426 to "Dec. 16, 2007" node 428. This indicates, "The Dark Knight has trailer release date of Dec. 16, 2007." "The Dark Knight" node 402 is connected by "Has movie ticket sale date" edge 420 to "Jun. 18, 2008" node 432. This indicates, "The Dark Knight has ticket sale date of Jun. 18, 2008." "The Dark Knight" node 402 is connected by "Has movie release date" edge 434 to "Jul. 18, 2007" node 436. This indicates, "The Dark Knight has movie release date of Jul. 18, 2007." "The Dark Knight" node 402 is connected by "Has last date in theatres" edge 438 to "Oct. 20, 2008" node 440. This indicates, "The Dark Knight has last date in theatres of Oct. 20, 2008." "The Dark Knight" node 402 is connected by "Has available on DVD date" edge 442 to "Dec. 9, 2008" node 444. This indicates, "The Dark Knight has available on DVD date of Dec. 9, 2008."

It will be understood that knowledge graph portion 400 is merely an example and that it may include nodes and edges not shown. For example, "Movie" node 404 may also be connected to other properties related to the entity type such as cast members, producers, directors, filming locations, news items related to the movie, e.g., awards or box office performance, and any other suitable data, or any combination thereof. Similarly, "Inception" node 446 may be connected to any suitable number of nodes containing further information related to its illustrated entity type node "Movie."

Figure 5:
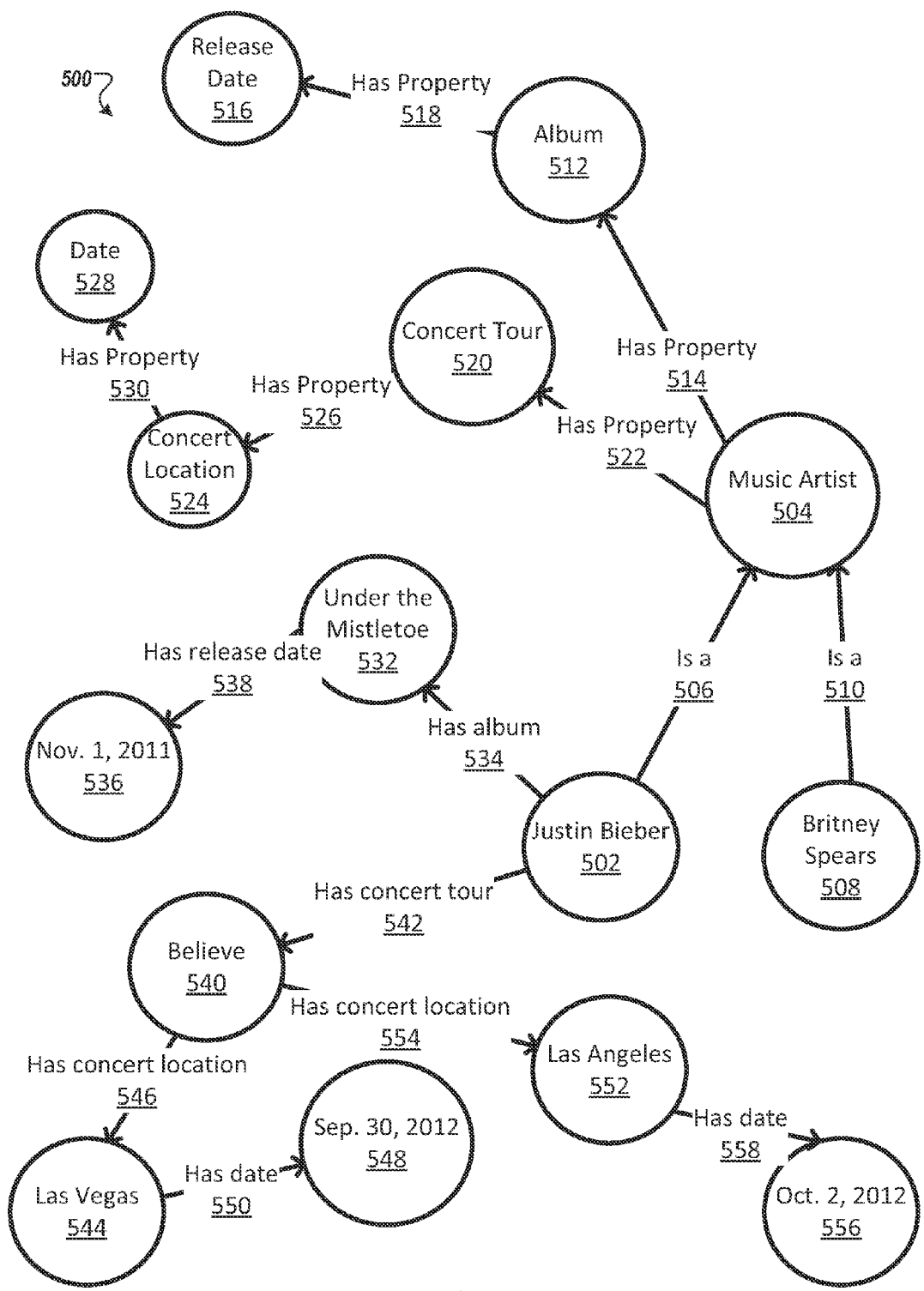
FIG. 5 illustrates another example knowledge graph portion.

FIG. 5 illustrates another example knowledge graph portion 500. Knowledge graph portion 500 includes information related to the musical artist entity "Justin Bieber," represented by "Justin Bieber" node 502. "Justin Bieber" node 502 is connected by "Is a" edge 506 to the "Music Artist" entity type node 504. "Britney Spears" node 508 is also connected to "Music Artist" node 504 by "Is a" edge 510.

The entity type "Music Artist" is defined by the connections from "Music Artist" node 504. For example, the type "Music Artist" is defined as having the properties "Album" by node 512 and edge 514 and "Concert Tour" by node 520 and edge 522. Additionally, the property "Album" is defined as having the property "Release Date" by node 516 and edge 518. The property "Concert Tour" is defined as having the property "Concert location" by node 524 and edge 526. Furthermore, the property "Concert location" is defined as having the property "Date" by node 528 and edge 530. These relationships define in part a schema associated with the entity type "Music Artist."

"Justin Bieber" node 502 is shown in knowledge graph portion 500 to be of the entity type "Music Artist," and this is connected to nodes containing values associated with the entity type. For example, "Justin Bieber" node 502 is connected by "Has album" edge 534 to "Under the Mistletoe" node 532. This indicates, "Justin Bieber has an album called "Under the Mistletoe." Furthermore, "Under the Mistletoe" node 532 is connected by "Has release date" edge 538 to "Nov. 1, 2011" node 536. This indicates, "Under the Mistletoe has a release date of Nov. 1, 2011." Combining nodes 502, 532, and 536 and edges 534 and 538 indicates, "Justin Bieber has an album called Under the Mistletoe that has a release date of Nov. 1 2011."

"Justin Bieber" node 502 is also connected by "Has concert tour" edge 542 to "Believe" node 540. This indicates, "Justin Bieber has a concert tour called Believe." Furthermore, "Believe" node 540 is connected to "Los Angeles" node 552 and "Las Vegas" 544 by "Has concert location" edges 554 and 546, respectively. This indicates, "Believe has a concert location in Los Angeles" and "Believe has a concert location in Las Vegas." Additionally, "Los Angeles" node 552 is connected by "Has date" edge 558 to "Oct. 2, 2012" node 556 and "Las Vegas" node 544 is connected by "Has date" edge 550 to "Sep. 30, 2012" node 548. Combining nodes 502, 540, 544, and 548 and edges 542, 546, and 550 indicates, "Justin Bieber has a concert tour called Believe that has a concert location in Las Vegas on Sep. 30, 2012." Combining nodes 502, 540, 552, and 556 and edges 542, 554, and 558 indicates, "Justin Bieber has a concert tour called Believe that has a concert location in Las Angeles on Oct. 2, 2012."

It will be understood that while knowledge graph portion 200 of FIG. 2, knowledge graph portion 300 of FIG. 3, knowledge graph portion 400 of FIG. 4, and knowledge graph portion 500 of FIG. 5 show portions of a knowledge graph, all pieces of information may be contained within a single graph and that these selections illustrated herein are merely an example. In some implementations, separate knowledge graphs are maintained for different respective domains, for different respective entity types, or according to any other suitable delimiting characteristic. In some implementations, separate knowledge graphs are maintained according to size constraints. In some implementations, a single knowledge graph is maintained for all entities and entity types.

A knowledge graph may be implemented using any suitable software constructs. In an example, a knowledge graph is implemented using object oriented constructs in which each node is an object with associated functions and variables. Edges, in this context, may be objects having associated functions and variables. In some implementations, data contained in a knowledge graph, pointed to by nodes of a knowledge graph, or both, is stored in any suitable one or more data repositories across one or more servers located in one or more geographic locations coupled by any suitable network architecture.

Figure 6:
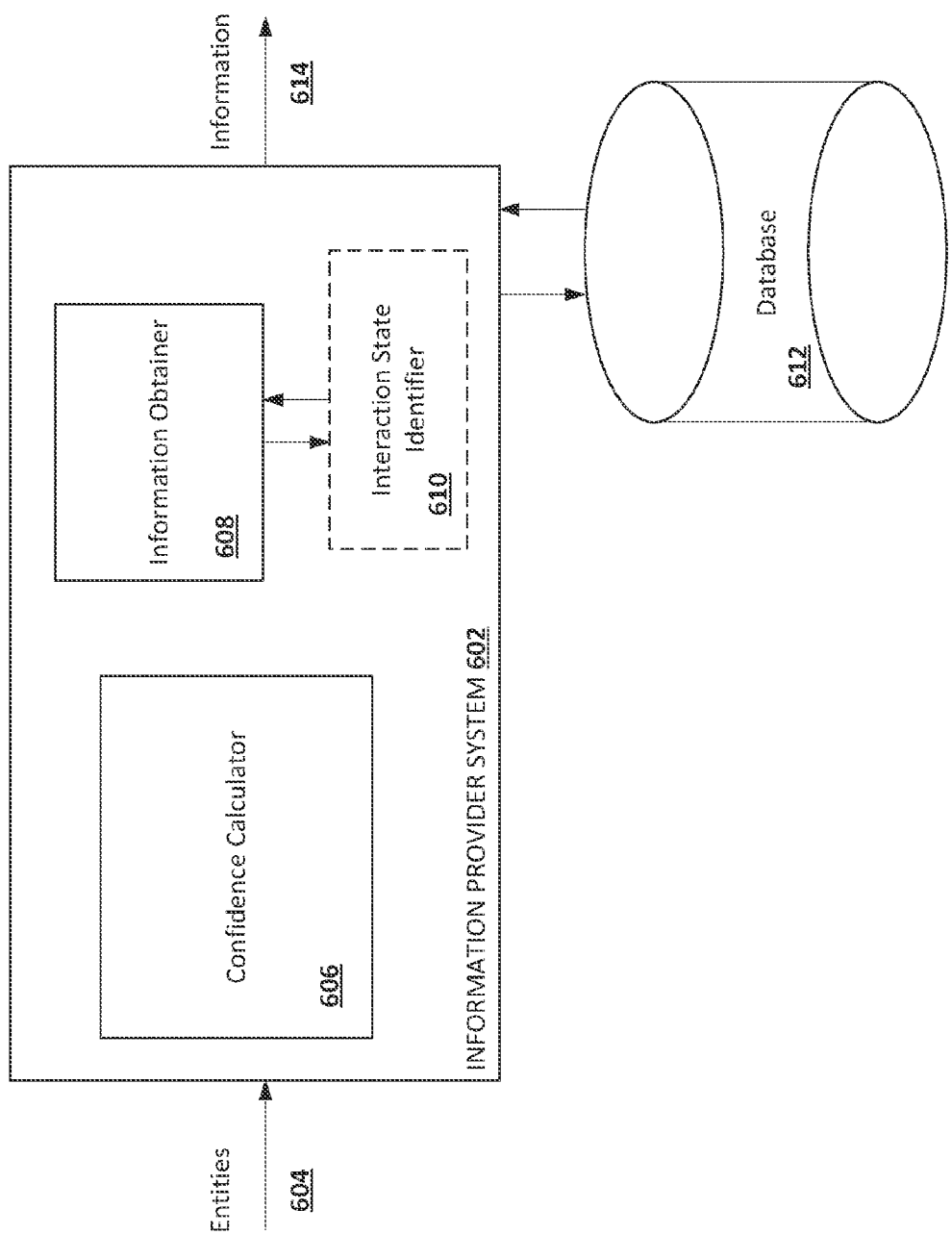
FIG. 6 illustrates an example information provider system.

FIG. 6 illustrates an example information provider system 602 as can be implemented for use in an Internet, an intranet, or another client and server environment. The information provider system 602 can be implemented as, for example, computer programs running on one or more computers in one or more locations that are coupled to each other through a network. The systems, components, and techniques described below can be implemented in the example information provider system.

The information provider system 602 includes a confidence calculator 606 and an information obtainer 608. In some implementations, the information provider system 602 also includes an interaction state identifier 610. The information provider system 602 can communicate with data source 612 through one or more wired or wireless networks, e.g., mobile phone networks, local area networks (LANs) or wide area networks (WANs), e.g., the Internet. In some implementations, data source 612 can be one or more data sources. For example, the information provider system 602 can communicate with one or more databases that contain data organized in the form of a knowledge graph, as described above. Alternatively, the information provider system 602 can communicate with one or more data sources, including publicly available sources, e.g., the Internet Move Database (IMDB), Wikipedia, Ticketmaster, Freebase, and/or a news source.

The information provider system 602 receives entities 604. The entities 604 are each associated with a particular user and a first score. In some implementations, entities 604 are derived from concepts that are of interest to a particular user. The entities can be of any entity type. Example entity types include movies, actors, music artists, concerts, authors, TV shows, etc. Concepts that are of interest to a particular user are determined from the particular user's online profile. A concept can be a person, place, thing, or idea. The online profile describes activity for the particular user across various web properties. For example, concepts of interest can be determined from the particular user's web search history, social network information, consumed media, location history, check-ins, and other sources.

The concepts of interest are then matched with entities in a data source, e.g., data organized in the form of a knowledge graph. For each matched entity, a first score is calculated that represents a level of confidence that the particular user is interested in the entity based on the presence of the entity in the particular user's online profile. In some implementations, information provider system 602 receives a continuous stream of entities that are associated with a plurality of different users.

In some implementations, concepts of interest to the user are received from a third-party provider. For example, a location based social networking service can provide the information provider system 602 with locations as concepts of interest for the user based on the user's historical location check-ins. As a further example, a third-party content provider can provide the information provider system 602 with movies as concepts of interest for the user based on the user's movie watching history. These concepts of interest are matched with entities in a data source, e.g., data organized in the form of a knowledge graph. The first score for entities provided by third-party providers can be based on additional information provided by the third-party providers for the entities. For example, the first score for a location entity provided by a location based social networking service can be based on additional information describing the number of times the user has checked in to the location. The greater the number of times the user has checked in to the location, the greater the first score for the location entity. As a further example, the first score for a movie entity provided by a content provider can be based on additional information describing the number of times the user has watched the movie. The greater the number of times the user has watched the movie, the greater the first score for the movie.

The confidence calculator 606 calculates a second score for each entity received by the information provider system 606, as described in more detail below with reference to FIG. 7. The second score represents a level of confidence that the user associated with the respective entity should receive notifications associated with the entity.

The information obtainer 508 obtains information 614 associated with the entities 604 based on the second scores, as described in more detail below with reference to FIG. 7. The information 614 can be obtained from one or more data sources 612, as described above. Example information that can be obtained includes upcoming book releases for author entity types, upcoming movie releases for actor entity types, new episodes for T.V. show entity types, upcoming album or single releases for music artist entity types, concert dates for concert entity types, ticket sale date for movie entity types, etc.

In some implementations, interaction state identifier 510 can identify interaction states of users with entities, which can be used to determine the kinds of information obtained by information obtainer 508, as described in more detail below with reference to FIG. 7.

The information provider system 602 provides the obtained information 614. The information obtained for a particular entity is made available to be presented to the user associated with the particular entity. In some implementations, the information 614 can be provided directly to the user. For example, the information 614 can be sent directly to the user's device. In other implementations, the information 614 can be provided to a notification system that makes additional determinations on when, whether, and how to provide the information to the user.

In some implementations, the obtained information for a particular entity is assigned a viewing window by the system. The viewing window determines when the information should be presented to the user relative to a time point. For example, if the system is serving the information directly to the user, the system will only serve the information within the assigned viewing window time frame for the obtained information. Alternatively, if the system is providing the information to a notification system, the notification system can use the viewing window assigned the information to determine when to provide the information to the user. In some implementations, the system assigns a standard viewing window for the different types of information. For example, the viewing window assigned to information describing an event can be based on the type of event, e.g., book release, movie trailer release, movie ticket release, movie release, album release. The viewing window can determine a length of time before and after the event actually occurs that the user should be presented with information for the event.

In some implementations, different signals can be used to modify the standard viewing window for information that is to be provided to users. For example, if the user has a very high level of interest for an entity, as indicated by the first score for the entity, the system can extend the viewing window for information that is obtained for the entity. Alternatively, or additionally, if a particular entity is popular, the viewing window for information associated with the particular entity can be extended. For example, if both a user and a large proportion of a population exhibit a high level of interest in Justin Bieber, the system can increase the viewing window for a notification about tickets going on sale for a Justin Bieber concert. Additional logic can be applied to the modification of viewing windows assigned to information. In some implementations, the degree of finality of an event described by the obtained information can be considered. The degree of finality represents a number of possible occurrences left for the event. In some implementations, the lower the number of possible occurrences left for the event, the higher the degree of finality. For example, the viewing window for information that describes a one-time symphony concert can be modified. Because the symphony concert has a high degree of finality, e.g., because it is a one-time event, the viewing window can be extended so that the information can be provided to the user at an earlier time point than originally specified by the viewing window. As a further example, the viewing window for information that describes a movie release can be modified. Because the movie has a low degree of finality, e.g., because there are multiple showings of the movie remaining, the viewing window can be shrunk so that the information is only provided to the user immediately prior to release of the movie.

In some implementations, the information can be provided to the user in a notification form. For example, the information can be provided so that the user device generates a visual notification, e.g., a screen to display the information, an audible notification, e.g., a speaker to generate an audible representation of the information, and/or a sensory notification, e.g., a motor to cause vibrations representing the information. Alternatively, or additionally, the information can be presented in the form of notification cards. The notification cards can display a title and description text of the information associated with the user's entities of interest. A picture or icon that represents the information can also be displayed. Links can also be provided with the notification cards so users can take additional actions on the provided information. For example, if the user is provided with a notification card for an upcoming concert, the notification card for the concert can additionally provide a link to purchase tickets for the concert. As a further example, if the user is provided with a notification card for an upcoming movie release, the notification card can additionally provide a link where the user can watch the trailer for the movie and/or purchase advanced movie tickets.

In some implementations, the system modifies the intensity of the notification form based on user interest in the entity. For example, if the user has a high first score for the entity, indicating a high level of interest, the system may provide the information to the user in a high intensity notification. The intensity of the notification may be based on whether or not there is visual, auditory, or tactile stimulation, the prominence of the visual display, repetition of the notification, any other suitable quality, or any combination thereof. In an example, for a high intensity notification the system may cause a user device to generate an alert noise and vibrate in addition to displaying a visual notification. In another example, for a low intensity notification, the system may cause a user device to generate only a visual display placed in an inconspicuous location on the user device screen.

Figure 7:
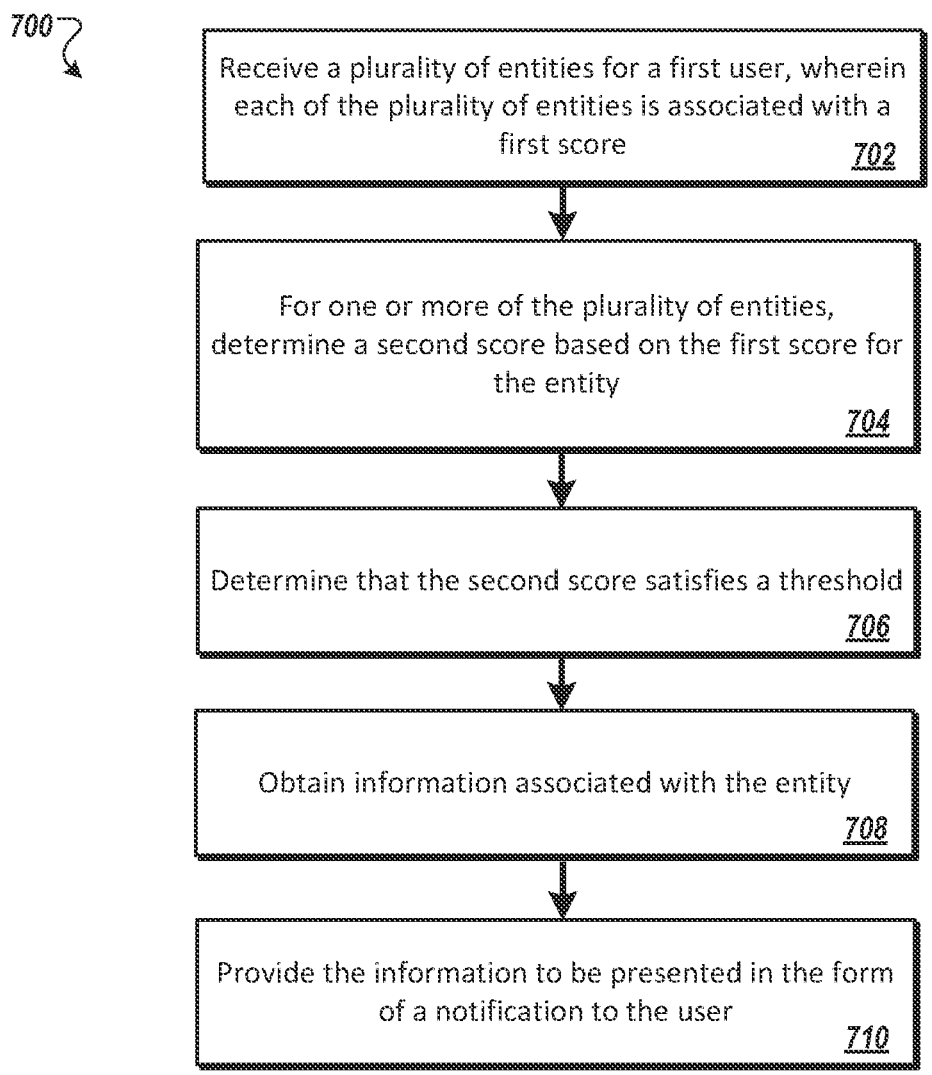
FIG. 7 illustrates an example method for providing information to be presented in the form of a notification to a user.

FIG. 7 illustrates an example method for providing information to be presented in the form of a notification to a user. For convenience, the example method 700 will be described in reference to a system that performs method 700. The system can be, for example, the information provider system 602 described above with reference to FIG. 6. In some implementations, the system can be one or more computers.

The system receives a plurality of entities for a first user (702). The system receives entities that are each associated with a particular user and a first score, as described above with reference to FIG. 6. The entities associated with the first user are grouped together.

In some implementations, the system can determine one or more common attributes for the plurality of entities for the first user. The one or more common attributes can be attributes that are common between one or more of the plurality of entities. The system can identify attributes for a particular entity from a knowledge graph portion containing the schema for the particular entity in a data source. The information that connects to the node for the particular entity in the knowledge graph portion can be attributes that define a particular characteristic of the node. Upon identifying the common attributes, the system can obtain additional entities that have the common attributes. For example, if the system received entities "To Rome with Love" and "Midnight in Paris" for the first user, the system can identify from one or more knowledge graphs that "To Rome with Love" and "Midnight in Paris" are both movies and are both directed by Woody Allen. The system can obtain additional entities that have these two attributes. For example, the system can obtain additional entities from one or more knowledge graphs that are also movies and directed by Woody Allen, such as "Annie Hall" and "Match Point."

For one or more of the plurality of entities, the system determines a second score based on the first score for the entity (704). The second score represents a confidence level that the first user should receive notifications for a particular entity. In some implementations, the system determines a second score for the top n-ranked entities, where n is an integer. For example, the system calculates a second score for the 20 entities with the greatest associated first scores. In some implementations, a second score is determined for each entity received for the first user. For example, a second score can be calculated for each entity as it is received by the system.

The second score for a particular entity is based on the first score for the particular entity. For example, in some implementations, the second score is proportional, e.g., directly proportional, to the first score for the particular entity. In some implementations, the second score is also based on one or more additional signals that indicate whether the user should receive notifications associated with the particular entity. The additional signals can include the entity type of the particular entity. Information associated with certain entity types in a knowledge graph may be more desirable than information associated with other entity types. For example, users may be more interested in receiving information associated with movie entity types than book entity types. The different entity types in the knowledge graph can be assigned a score based on whether users would like to receive notifications for that particular entity type. Another additional signal can be a popularity of the particular entity. For example, the popularity can be determined from the number of users that are also interested in the particular entity. Alternatively, or additionally, the popularity can be determined from common measures of popularity for the particular entity, e.g., web searches for the entity, popularity trends on social networks, etc. For example, if the entity is a movie, common measures of popularity for the movie can include the number of web searches for the movie, a level of interest for the movie across social networks, the number of box office tickets sold for the movie, total gross for the movie, etc. As a further example, if the entity is a musical artist, common measures of popularity for the musical artist can include the number of web searches for the musical artist, a level of interest for the musical artist across social networks, total number of albums sold, number of hits the musical artist's music videos have received across one or more content providers, etc. Other signals can be used. For example, the proximity of the user to a geo-location associated with the particular entity can be used to indicate whether the user would like notifications associated with the particular entity. In some implementations, any combination of properties associated with the entity in a knowledge graph can be used.

Another signal for the second score can be feedback from users who have received notifications associated with the particular entity in the past. In some implementations, feedback from users similar to the first user can be used. The similarity between users can be determined from web search history, online profile, and social network similarities. For example, an indication from similar users that notifications associated with the particular entity were unhelpful or unwanted can be used as negative signals when determining whether to provide the first user with a notification associated with the particular entity. Feedback that the notifications were unhelpful or unwanted can include the similar users ignoring the notifications, cancelling the notifications, and/or not interacting with the notification. In some implementations, the users can provide direct negative feedback for the notifications, for example, when provided with a "Was this notification helpful?" prompt. Alternatively, an indication from similar users that notifications associated with the particular entity were useful or wanted can be used as positive signals when determining whether to provide the first user with a notification associated with the particular entity. Feedback that the notifications were useful or wanted can include the similar users selecting the notifications and/or interacting with the notification in some manner, for example, clicking on links provided by the notification. In some implementations, the users can provide direct positive feedback for the notifications, for example, when provided with a "Was this notification helpful?" prompt.

In some implementations, the one or more signals that the system uses to determine the second score for the particular entity is provided to a model that has been trained, for example, using machine learning as described below with reference to FIG. 9. The model applies the appropriate learned weights to the signals. Alternatively, manually determined weights can be applied to the signals. The resulting values are used to calculate the second score. The second score can be calculated by adding or multiplying the resulting values. Other calculations can be used. For example, the second score can be calculated by averaging the resulting values.

If the second score does not satisfy a threshold, no further action is taken to provide the user with information associated with the particular entity. If the system determines that the second score does satisfy the threshold (706), the system proceeds to obtain information associated with the particular entity (708). In some implementations, the information is obtained from a knowledge graph portion containing the schema for the particular entity in a data source. Any information that is associated with the particular entity node in the knowledge graph portion can be obtained by the system.

For example, the system receives "The Dark Knight" as an entity of interest for the first user. A second score is calculated for "The Dark Knight," and the second score is determined to satisfy the threshold. The system can access a knowledge graph portion in a data source containing a schema for "The Dark Knight" in order to obtain information associated with "The Dark Knight," for example, knowledge graph portion 400 in FIG. 4. Knowledge graph portion 400 illustrates a variety of information associated with "The Dark Knight" that is relevant for a film. The trailer release date, movie ticket sale date, movie release date, last date in theaters, and available on DVD date for "The Dark Knight" are all available information in knowledge graph portion 400 for the system to obtain about the entity "The Dark Knight." In some implementations, the system can obtain every piece of information associated with the entity that is available.

As a further example, the system receives "Justin Bieber" as an entity of interest for the first user. A second score is calculated for "Justin Bieber," and the second score is determined to satisfy the threshold. The system can access a knowledge graph portion in a data source containing a schema for "Justin Bieber" in order to obtain information associated with "Justin Bieber," for example, knowledge graph portion 500 in FIG. 5. Knowledge graph portion 500 illustrates a variety of information associated with "Justin Bieber" that is relevant for a music artist. Album information, concert tours, and concert locations and dates are all available information in knowledge graph 500 for the system to obtain about the entity "Justin Bieber." In some implementations, the system only obtains a subset of information associated with the entity. For example, the freshness of the information can be considered when determining what information to obtain. For example, the system can forego obtaining any information about events that have occurred in the past, e.g., Justin Bieber album Under the Mistletoe that has a past release date of Nov. 1, 2011, and only obtain upcoming event information, e.g., Justin Bieber upcoming concert tour Believe in Las Vegas on Sep. 30, 2012.

In some implementations, the system can obtain information associated with the particular entity from other types of data sources. For example, information associated with movie entities can be directly obtained from publicly available sources IMDB, Wikipedia, etc. Information associated with music artist entities can be obtained directly from Wikipedia, Ticketmaster, etc. Additionally, online news sources can be sources of information for the system. The system can obtain relevant news items from news sources for the particular entity. For example, news that "The Dark Knight" won two Oscars can be obtained by the system. Freshness of the news item can determine if it is worth obtaining. For example, the system may not obtain news that "The Dark Knight" won two Oscars if the occurrence of the event occurred a significant amount of time ago.

In some implementations, the system can determine the interaction state of the first user with the particular entity. An interaction state describes how a user has engaged with a particular entity. The first user's interaction state can help the system determine what information associated with the entity to obtain. For example, the system can obtain only information that would only be logically useful if it proceeded the first user's current interaction state with the entity. The system can identify the user's interaction state with the entity based on the first user's online profile, e.g., web search history, social network information, consumed media, location history, check-ins, and other sources.

For example, the system can determine that the first user's interaction state with the movie "The Dark Knight" is that the user has just watched the movie in theaters, for example, based on a receipt for the movie ticket in the first user's email account or a check-in at a movie showing for "The Dark Knight." This interaction state suggests to the system that the first user would not be interested in any information that would logically precede the watching of "The Dark Knight" in theaters. Therefore, the system can forego obtaining such information from knowledge graph portion 400, for example, information regarding the trailer release date, movie ticket sale date, movie release date, and last date in theatres for "The Dark Knight." The system would obtain only information regarding "The Dark Knight" available on DVD date, as that is the only piece of information that would be applicable to someone that has already watched the movie in theaters.

In some implementations, the system can obtain information for specific attributes associated with the entity. The system can use the context of the entity in the first user's online profile to determine specific attributes for the entity that the user would like to be notified about. Based on the context of the entity in the first user's online profile, the system can assign a score to different attributes for the entity. The more the entity appears in the context of a particular attribute, the greater the score for the particular attribute. If the score for a particular attribute satisfies a threshold, then the system will obtain information that is specific to the particular attribute for the entity. For example, if the system is obtaining information associated with the entity "Arnold Schwarzenegger," the system can obtain information about specific attributes associated with Arnold Schwarzenegger. Specific attributes for Arnold Schwarzenegger, e.g., body builder, actor, and governor, can be determined from a knowledge graph portion containing a schema for "Arnold Schwarzenegger." From the first user's online profile, the system can determine which of these attributes the first user would be more interested in. For example, if the first user's online profile shows that the first user has searched for "Arnold Schwarzenegger actor," the score for the actor attribute for Arnold Schwarzenegger is increased. Other signals from the first user's online profile can be used, for example, information from the online profile that the first user has watched movies starring Arnold Schwarzenegger, discussed movies starring Arnold Schwarzenegger, or checked in to movie showings for movies starring Arnold Schwarzenegger. If the score for the attribute meets the threshold, then the system obtains information associated with Arnold Schwarzenegger, the actor.

In some implementations, the system scores predetermined attributes for the entity type of the particular entity received for the first user. The predetermined attributes for the entity type are attributes that have been manually curated as information that users could want notifications for. The scores for the predetermined attributes can be second scores that represent a level of confidence that the user should receive notifications for the respective attribute for the entity. The second scores can be calculated based on any of the above-described signals. If the second score for a particular attribute satisfies a threshold, the system obtains information associated with the attribute for the entity. For example, the predetermined attributes for movie entity types can be movie ticket release dates, box office release dates, and DVD release dates. In response to the system receiving a movie entity for the first user, a second score can be calculated for each of the predetermined movie attributes. The second scores can be calculated based on one or more signals, e.g., the first score for the movie entity, entity type of the movie entity, popularity of the movie entity, proximity of the movie entity, user feedback regarding similar notifications for the movie entity, and interaction state of the user with the movie entity. The system obtains information associated with the predetermined movie attributes that have second scores that satisfy the threshold.

In some implementations, the first user can directly indicate to the system entities for the system to obtain information for. The first user can also specify to the system specific attributes for entities to obtain information for. For example, the first user can specify entities of interest and specific attributes of interest for entities to the system by manually inputting text describing the entities and attributes into a user interface provided by the system. The system can obtain information for the entities directly provided by the first user.

The system provides the information to be presented in the form of a notification to the user (710). In some implementations, the information is provided according to a viewing window assigned the information, as described above with reference to FIG. 6. For example, the information can be provided directly to the first user within the time window assigned the information. Alternatively, the information and associated viewing window can be provided to a notification system. The notification system can use the viewing window assigned the information to determine when to provide the information to the first user.

Figure 8:
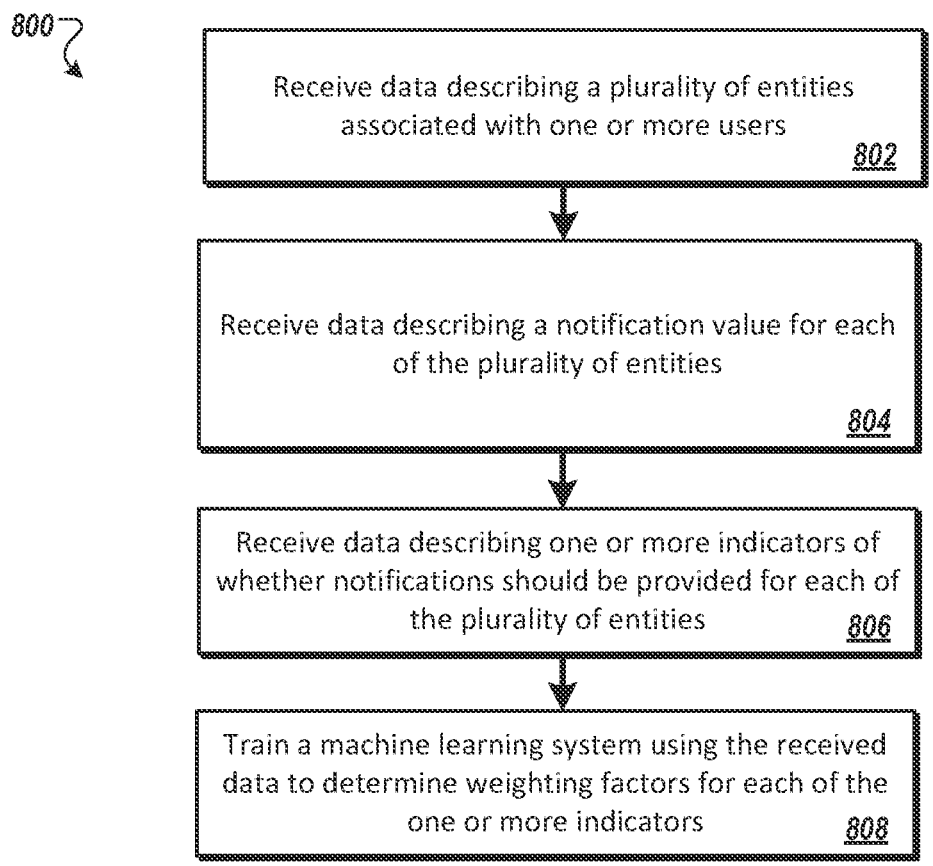
FIG. 8 illustrates an example method for training a machine learning system to output a second score given an input of signals.

FIG. 8 illustrates an example method for training a machine learning system to output a second score given an input of signals. For convenience, the example method 800 will be described in reference to a system that performs method 800. The system can be, for example, the information provider system 602 described above with reference to FIG. 6.

The system receives data describing a plurality of entities associated with one or more users (802). The system also receives data describing a notification value (804) and one or more indicators of whether notifications should be provided for each of the entities (806). For example, the one or more indicators can be the signals described above with reference to FIG. 7. In some implementations, the data can be collected by presenting users with one or more entities that they are interested in. The users can provide the system with a notification value for each entity they are presented with. The notification value indicates the user's desire to receive notifications associated with the entity. In some implementations, the provided notification values range in value from −1 to 1. Various ranges can alternatively be used. In other implementations, the provided notification values can be 0 or 1.

The system trains the machine learning system using the received data (808), for example, using conventional techniques. For example, the data can be transformed into a plurality of feature vectors for each entity. Each feature vector for an entity represents the data for an individual indicator of whether notifications should be provided for the entity. A learning algorithm analyzes the training data comprising of the feature vectors and notification values for each entity in the machine learning system to determine the appropriate weights for each of the indicators.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
receiving a plurality of entities associated with a first user of a plurality of users, wherein each entity of the plurality of entities has an entity type of a plurality of entity types, and wherein each entity is derived from concepts of interest determined to be of interest to the first user and matched with entities in a knowledge graph, wherein each entity type is associated with one or more attributes and a relationship between each entity type and the associated one or more attributes forms a respective schema, and wherein each entity is associated with a first score for the first user, and wherein the first score for each entity is calculated to represent a level of confidence that the first user is interested in the respective entity based on the association of the entity with the first user; and
for one or more entity of the plurality of entities:
determining a second score for the entity based on the first score of the entity and one or more additional signals that indicate whether the first user is to receive notifications for the entity, wherein the second score indicates a level of confidence that the first user associated with the entity is to receive notifications associated with the entity;
determining whether the second score satisfies a threshold;
in response to a determination that the second score satisfies a threshold, obtaining information from one or more attributes associated with the entity; and
providing the information to be presented in a notification to the first user.

2. The method of claim 1, further comprising:
for one or more second entities of the plurality of entities:
calculating a second score based on the first score for the entity;
determining that the second score does not satisfy the threshold; and
determining that the user should not receive notifications associated with the entity.

3. The method of claim 1, wherein the one or more signals describe at least one of:
a popularity of the entity;
a proximity of the first user to a geo-location associated with the entity; and
feedback about notifications associated with the entity, wherein the feedback is provided by one or more other users that have received notifications associated with the entity; and
wherein determining the second score comprises providing the first score and one or more additional signals to a trained machine learning system.

4. The method of claim 1, wherein obtaining the one or more attributes of the entity further comprises:
identifying a first user's interaction state with the entity based on data associated with the first user; and
determining the one or more attributes to obtain based on the first user's interaction state with the entity.

5. The method of claim 4, wherein identifying the first user's interaction state with the entity comprises:
determining how the first user has engaged with the entity from an online profile of the first user; and
identifying the first user's interaction state with the entity based on how the first user has engaged with the entity.

6. The method of claim 4, wherein determining the one or more attributes to obtain based on the first user's interaction state with the entity comprises:
identifying attributes that logically follow the first user's interaction state with the entity.

7. The method of claim 1, wherein obtaining the one or more attributes of the entity further comprises:
obtaining the one or more attributes of the entity in a data source.

8. The method of claim 7, wherein obtaining the one or more attributes of the entity in a data source further comprises:
obtaining the one or more attributes based on a freshness of the attributes.

9. The method of claim 7, wherein the data source is one or more knowledge graphs or one or more publicly available databases.

10. The method of claim 1, wherein providing the one or more attributes to be presented comprises:
assigning a viewing window to the attributes, wherein the viewing window determines when the attributes should be presented to the user relative to a time point; and
presenting the attributes to the first user based on the viewing window.

11. The method of claim 10, further comprising:
modifying the viewing window based on one or more signals that indicate at least one of:
a popularity of the entity;
a level of interest of the first user in the entity; or
a finality of an event described by the one or more attributes.

12. The method of claim 1, wherein the notification includes at least one of:
a title describing the attributes to be presented;
a description of the attributes to be presented; or
links that allow the first user to take additional actions on the attribute to be presented.

13. A system, comprising:
one or more computers configured to perform operations comprising:
receiving a plurality of entities associated with a first user of a plurality of users, wherein each entity of the plurality of entities has an entity type of a plurality of entity types, and wherein each entity is derived from concepts of interest determined to be of interest to the first user and matched with entities in a knowledge graph, wherein each entity type is associated with one or more attributes and a relationship between each entity type and the associated one or more attributes forms a respective schema, and wherein each entity is associated with a first score for the first user, and wherein the first score for each entity is calculated to represent a level of confidence that the first user is interested in the respective entity based on the association of the entity with the first user; and
for one or more entity of the plurality of entities:
determining a second score for the entity based on the first score of the entity and one or more additional signals that indicate whether the first user is to receive notifications for the entity, wherein the second score indicates a level of confidence that the first user associated with the entity is to receive notifications associated with the entity;

determining whether the second score satisfies a threshold;

in response to a determination that the second score satisfies a threshold, obtaining information from one or more attributes associated with the entity; and providing the information to be presented in a notification to the first user.

14. The system of claim 13, wherein the operations further comprise:

for one or more second entities of the plurality of entities:
calculating a second score based on the first score for the entity;
determining that the second score does not satisfy the threshold; and
determining that the user should not receive notifications associated with the entity.

15. The system of claim 13, wherein the one or more signals describe at least one of:
a popularity of the entity;
a proximity of the first user to a geo-location associated with the entity; and
feedback about notifications associated with the entity, wherein the feedback is provided by one or more other users that have received notifications associated with the entity; and
wherein determining the second score comprises providing the first score and one or more additional signals to a trained machine learning system.

16. The system of claim 13, wherein obtaining the one or more attributes of the entity further comprises:
identifying a first user's interaction state with the entity based on data associated with the first user; and
determining the one or more attributes to obtain based on the first user's interaction state with the entity.

17. The system of claim 16, wherein identifying the first user's interaction state with the entity comprises:
determining how the first user has engaged with the entity from an online profile of the first user; and
identifying the first user's interaction state with the entity based on how the first user has engaged with the entity.

18. The system of claim 16, wherein determining the one or more attributes to obtain based on the first user's interaction state with the entity comprises:
identifying attributes that logically follow the first user's interaction state with the entity.

19. The system of claim 13, wherein obtaining the one or more attributes of the entity further comprises:
obtaining the one or more attributes of the entity in a data source.

20. The system of claim 19, wherein obtaining the one or more attributes of the entity in a data source further comprises:
obtaining the one or more attributes based on a freshness of the attributes.

21. The system of claim 19, wherein the data source is one or more knowledge graphs or one or more publicly available databases.

22. The system of claim 13, wherein providing the one or more attributes to be presented comprises:
assigning a viewing window to the attributes, wherein the viewing window determines when the attributes should be presented to the user relative to a time point; and
presenting the attributes to the first user based on the viewing window.

23. The system of claim 22, wherein the operations further comprise:
modifying the viewing window based on one or more signals that indicate at least one of:
a popularity of the entity;
a level of interest of the first user in the entity; or
a finality of an event described by the one or more attributes.

24. The system of claim 13, wherein the notification includes at least one of:
a title describing the attributes to be presented;
a description of the attributes to be presented; or
links that allow the first user to take additional actions on the attributes to be presented.

25. A non-transitory computer storage medium encoded with a computer program, the program comprising instructions that when executed by one or more computers cause the one or more computers to perform operations comprising:

receiving a plurality of entities associated with a first user of a plurality of users, wherein each entity of the plurality of entities has an entity type of a plurality of entity types, and wherein each entity is derived from concepts of interest determined to be of interest to the first user and matched with entities in a knowledge graph, wherein each entity type is associated with one or more attributes and a relationship between each entity type and the associated one or more attributes forms a respective schema, and wherein each entity is associated with a first score for the first user, and wherein the first score for each entity is calculated to represent a level of confidence that the first user is interested in the respective entity based on the association of the entity with the first user; and for one or more entity of the plurality of entities:
determining a second score for the entity based on the first score of the entity and one or more additional signals that indicate whether the first user is to receive notifications for the entity, wherein the second score indicates a level of confidence that the first user associated with the entity is to receive notifications associated with the entity;
determining whether the second score satisfies a threshold;
in response to a determination that the second score satisfies a threshold, obtaining information from one or more attributes associated with the entity; and
providing the information to be presented in a notification to the first user.

26. The computer storage medium of claim 25, wherein the operations further comprise:

for one or more second entities of the plurality of entities:
calculating a second score based on the first score for the entity;
determining that the second score does not satisfy the threshold; and
determining that the user should not receive notifications associated with the entity.

27. The computer storage medium of claim 25, wherein the one or more signals describe at least one of:
a popularity of the entity;
a proximity of the first user to a geo-location associated with the entity; and feedback about notifications associated with the entity, wherein the feedback is provided by one or more other users that have received notifications associated with the entity; and wherein determining the second score comprises providing the first score and one or more additional signals to a trained machine learning system.

28. The computer storage medium of claim 25, wherein obtaining the one or more attributes of the entity further comprises:

identifying a first user's interaction state with the entity based on data associated with the first user; and determining the one or more attributes to obtain based on the first user's interaction state with the entity.

29. The computer storage medium of claim 28, wherein identifying the first user's interaction state with the entity comprises:

determining how the first user has engaged with the entity from an online profile of the first user; and identifying the first user's interaction state with the entity based on how the first user has engaged with the entity.

30. The computer storage medium of claim 28, wherein determining the one or more attributes to obtain based on the first user's interaction state with the entity comprises:

identifying attributes that logically follow the first user's interaction state with the entity.

31. The computer storage medium of claim 25, wherein obtaining the one or more attributes of the entity further comprises:

obtaining the one or more attributes of the entity in a data source.

32. The computer storage medium of claim 31, wherein obtaining the one or more attributes of the entity in a data source further comprises: obtaining the one or more attributes based on a freshness of the attributes.

33. The computer storage medium of claim 31, wherein the data source is one or more knowledge graphs or one or more publicly available databases.

34. The computer storage medium of claim 25, wherein providing one of the one or more attributes to be presented comprises:

assigning a viewing window to the attributes, wherein the viewing window determines when the attributes should be presented to the user relative to a time point; and presenting the attributes to the first user based on the viewing window.

35. The computer storage medium of claim 34, wherein the operations further comprise:

modifying the viewing window based on one or more signals that indicate at least one of:

a popularity of the entity;

a level of interest of the first user in the entity; or a finality of an event described by the one or more attributes.

36. The computer storage medium of claim 25, wherein the notification includes at least one of:

a title describing the attributes to be presented;

a description of the attributes to be presented; or links that allow the first user to take additional actions on the attributes to be presented.

* * * * *